United States Patent
Douceur et al.

(10) Patent No.: US 7,373,404 B2
(45) Date of Patent: *May 13, 2008

(54) SUSPENSION AND REINSTATEMENT OF REFERENCE

(75) Inventors: John R. Douceur, Bellevue, WA (US); Yoram Bernet, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 367 days.

This patent is subject to a terminal disclaimer.

(21) Appl. No.: 10/966,916

(22) Filed: Oct. 15, 2004

(65) Prior Publication Data

US 2005/0071467 A1    Mar. 31, 2005

Related U.S. Application Data

(62) Division of application No. 09/608,341, filed on Jun. 29, 2000.

(51) Int. Cl.
*G06F 15/16* (2006.01)

(52) U.S. Cl. ............... 709/224; 709/240; 709/241; 709/242

(58) Field of Classification Search .......... 709/224
See application file for complete search history.

(56) References Cited

U.S. PATENT DOCUMENTS

| | | | |
|---|---|---|---|
| 5,133,053 A | | 7/1992 | Johnson et al. |
| 5,644,768 A | * | 7/1997 | Periwal et al. ............ 718/102 |
| 5,765,192 A | * | 6/1998 | Berliner ..................... 711/136 |
| 5,802,590 A | * | 9/1998 | Draves ....................... 711/164 |
| 5,878,218 A | | 3/1999 | Maddalozzo, Jr. et al. |
| 6,078,747 A | * | 6/2000 | Jewitt .......................... 717/164 |
| 6,101,508 A | | 8/2000 | Wolff |
| 6,205,475 B1 | | 3/2001 | Pitts |
| 6,330,584 B1 | * | 12/2001 | Joffe et al. ................. 718/107 |
| 6,636,847 B1 | | 10/2003 | Spires |
| 6,636,874 B1 | * | 10/2003 | Douceur et al. ........... 707/201 |
| 6,643,803 B1 | * | 11/2003 | Swoboda et al. ........... 714/38 |
| 6,931,641 B1 | * | 8/2005 | Davis et al. ................ 718/108 |
| 6,934,757 B1 | | 8/2005 | Kalantar et al. |
| 7,237,022 B1 | | 6/2007 | Douceur et al. |
| 2001/0047382 A1 | * | 11/2001 | Sachedina et al. .......... 709/104 |

* cited by examiner

*Primary Examiner*—Jason Cardone
*Assistant Examiner*—Mitra Kianersi

(57) ABSTRACT

A handle administration system is described in which software agents receive handles to various resources that they can use to obtain the resources. The described embodiments provide multiple states that can be assumed by the handles. An unassigned state is provided in which handles are not assigned to a particular resource, nor can they be dereferenced to obtain pointers to any resources. An assigned state is provided in which handles are assigned to a particular resource and can be dereferenced to obtain a pointer to the resource. A suspended state is provided in which the handles are assigned to a particular resource but cannot be dereferenced to obtain a pointer to that resource. Advantageously, a suspended handle can be reinstated to assume the assigned state. In one embodiment, the handle system is implemented by incorporating a suitable field in a handle database that is used to indicate that a handle is suspended. In another embodiment, no additional fields are necessary. Rather, handle values in the handle database are manipulated to indicate that a handle has been suspended. These manipulations can be easily undone to reinstate a handle. In the described embodiment, a three state handle system can be advantageously employed to implement a two-phase commit operation.

36 Claims, 7 Drawing Sheets

| Type | Field | Description |
|---|---|---|
| Handle | handle | handle value |
| Resource* | resource | pointer to resource |
| bool | suspended | Indicates suspended handle |

500 ↗
502 — Type
504 — Handle
506 — Resource*

Fig. 5

| Index | handle | resource | suspended |
|---|---|---|---|
| 0 | 0 | A | false |
| 1 | 1 | B | false |
| 2 | 2 | C | false |
| 3 | 3 | D | true |

600 ↗
602 — Index
604 — handle
606 — resource
608 — suspended

Fig. 6

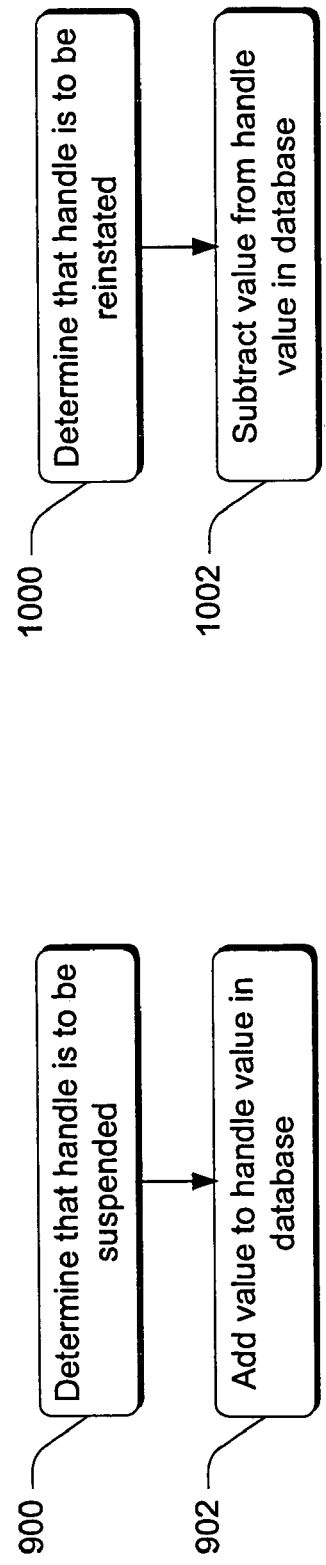

SUSPENSION AND REINSTATEMENT OF REFERENCE

RELATED APPLICATIONS

This application is a divisional of and claims priority to U.S. patent application Ser. No. 09/608,341, filed Jun. 29, 2000, the disclosure of which is incorporated by reference herein.

TECHNICAL FIELD

This invention relates to handle administration systems and methods, and particularly to handle administration systems in which reference handles are used to access resources that are managed by a resource manager.

BACKGROUND

It is not uncommon for software modules operating on computer systems to require access to shared resources. For example, a given computer program may require access to files maintained by a file system, or it may require access to network connections maintained by a network driver. Network drivers may require access to information structures maintained by a network packet classifier. This is a complex arrangement that includes numerous software modules, such as software drivers requiring access to many shared resources and an access supervisor that either maintains the resources or at least intercedes when a software module attempts to access a resource.

Intercession by an access supervisor is important for several reasons. One especially important reason is associated with a situation when a software module deletes a resource. Specifically, if a first software module deletes a resource, then other software modules that maintain direct pointers to the resource will be unable to access or use the resource. This is because their pointers will no longer point to a valid resource. Attempts have been made to solve this problem by notifying software modules when a resource deletion occurs. However, this requires detailed accounting and tracking of software modules and their respective pointers to the resources. As a result, this process is extremely expensive and very complex.

Another attempt to solve this problem involves having an access supervisor intercede when a software module requires access to a particular resource. Interceding ensures that the particular resource still exists before the software module is granted access to the particular resource. Typically, this is accomplished by having the access supervisor, through a handle administrator, issue a handle to each software module for a particular resource instead of allowing each software module a direct pointer to that particular resource. The handle is associated with the resource and is used to refer to the particular resource when it is desired to be used by the software module. The software module does not use the handle to directly access the resource. Rather, the software module presents the handle to the access supervisor, which can then use the handle to obtain a pointer to the resource for that software module. The process of converting a handle for a resource into a pointer to that resource is known as dereferencing.

Handle administration systems are typically characterized by having handles that can assume one of two states—an assigned state and an unassigned state. When a handle is in the assigned state, the handle administrator has associated that handle with both a resource and a pointer to the resource. The handle can then be used by software modules any time they want to obtain a pointer to the resource. To obtain a pointer to a resource, the software modules simply present the handle to the access supervisor which then checks to determine whether the handle is valid. If the handle is valid, then the associated pointer to the resource can be returned to the software module. If the handle is not valid, then an appropriate notification to the software module can be generated. When a handle is in the unassigned state, it is not associated with any resource and thus cannot be used to access a resource. An assigned handle becomes unassigned when it is "released". A handle can be released when the resource with which it is associated is removed or is no longer available for use by the software modules. Releasing a handle means that the handle can no longer be used to access the resource with which it was formerly associated. Once a handle is released, it is available to be associated with another resource and thereby returned to the assigned state.

It would be very desirable, in some situations, to have the ability to tentatively release a handle. Such a tentatively released handle is still associated with a resource, but it is not considered valid, so it cannot be dereferenced to obtain a pointer to the associated resource. Because the tentatively released handle is not fully released, it is not available to be associated with another resource. This tentatively released handle could then be permanently released into an unassigned state, thus making it available for assignment to another resource, or it could be reinstated into an assigned state that maintains its association with the resource with which it has already been assigned. Presently, however, there are no known handle administration systems that allow this kind of operation.

Accordingly, this invention arose out of concerns associated with improving handle administration systems and methods.

SUMMARY

A handle administration system is described in which software agents receive handles to various resources. The illustrated and described embodiments provide multiple states that can be assumed by the handles. An unassigned state is provided in which handles are not assigned to a particular resource, nor can they be dereferenced into pointers to any resources. In the unassigned state, the handles are available for assignment to particular resources. An assigned state is provided in which handles are assigned to a particular resource and can be dereferenced to obtain a pointer to the resource. A suspended state is provided in which the handles are assigned to a particular resource but cannot be dereferenced to obtain a pointer to that resource. Advantageously, a suspended handle can be reinstated to assume the assigned state.

In the described embodiment, there are four actions that can cause transition between the multiple states. From the unassigned state, a handle can be assigned so that it assumes the assigned state. When in the assigned state, a handle can be released so that it assumes the unassigned state. Additionally, when in the assigned state, a handle can be suspended so that it assumes the suspended state. Once in the suspended state, a handle can be reinstated so that it assumes the assigned state. Additionally, in the suspended state, a handle can be released so that it assumes the unassigned state.

Having the suspended state advantageously enables certain operations to be conducted which, in previous handle systems were impossible to implement. An exemplary operation is a two-phase commit. In a two phase commit operation, two or more agents are each asked to suspend a handle associated with a particular resource (phase 1). If all of the agents can successfully suspend their handles, then all of the handles are released (phase 2). If any agent is unable to suspend its handle, all of the handles are reinstated so that they assume the assigned state.

In one embodiment, a three state handle system is implemented by incorporating a suitable field in a handle database that is used to manage the handles. The incorporated field can be a flag that is set to indicate that a particular handle has been suspended. In another embodiment, no additional database fields are necessary to implement the three state handle system. Here, a handle database includes a field for handle values. The handle value is the value that is given to an agent when it desires access to a resource. In this embodiment, when a handle is suspended, a value is added to the handle value to yield a resultant value. When an agent presents the original handle value to access the handle's associated resource, the handle administrator can check the validity of the presented handle value by comparing it against the resultant handle value. Since the two compared handle values do not match, the handle is treated as an invalid handle. To reinstate a handle from the suspended state into the assigned state, the value that was originally added to the handle value is subtracted from the handle value to yield the original handle value. Now, when an agent presents the handle value it will compare favorably and thus be appropriately treated as a valid handle.

BRIEF DESCRIPTION OF THE DRAWINGS

FIG. 5 is a diagram that illustrates a handle record in accordance with one embodiment.

FIG. 6 is a diagram of a handle database that is used in a handle administration system in accordance with the FIG. 5 handle record.

FIG. 8 is a diagram of a handle database in accordance with one embodiment.

FIG. 9 is a flow diagram that describes steps in a suspension method in accordance with the described embodiment.

FIG. 10 is a flow diagram that describes steps in a reinstatement method in accordance with the described embodiment.

DETAILED DESCRIPTION

Exemplary Operating Environment

Figure 1:
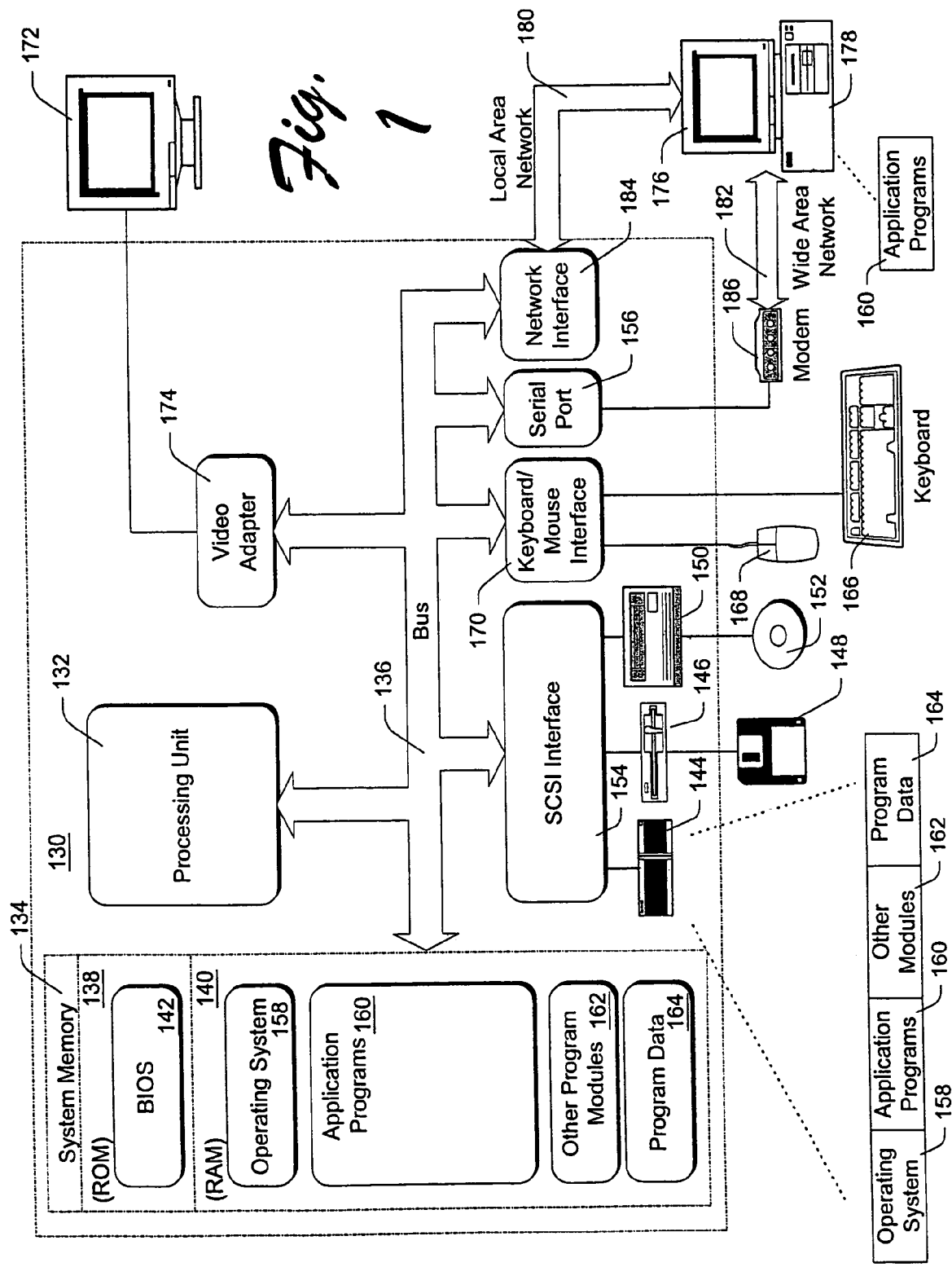
FIG. 1 is an exemplary computer system that is suitable for implementing the embodiments discussed below.

FIG. 1 shows but one example of a computer 130 that can be used to implement the described embodiments.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162 (such as one or more image synthesizing programs), and program data 164. A user may enter commands and information into computer 130 through input devices such as a keyboard 166 and a pointing device 168. Other input devices (not shown) may include a microphone, joystick, game pad, satellite dish, scanner, or the like. The input devices enable images to be digitized in a conventional manner, and used in accordance with the described embodiment. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described, herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Handle Administration System

Figure 2:
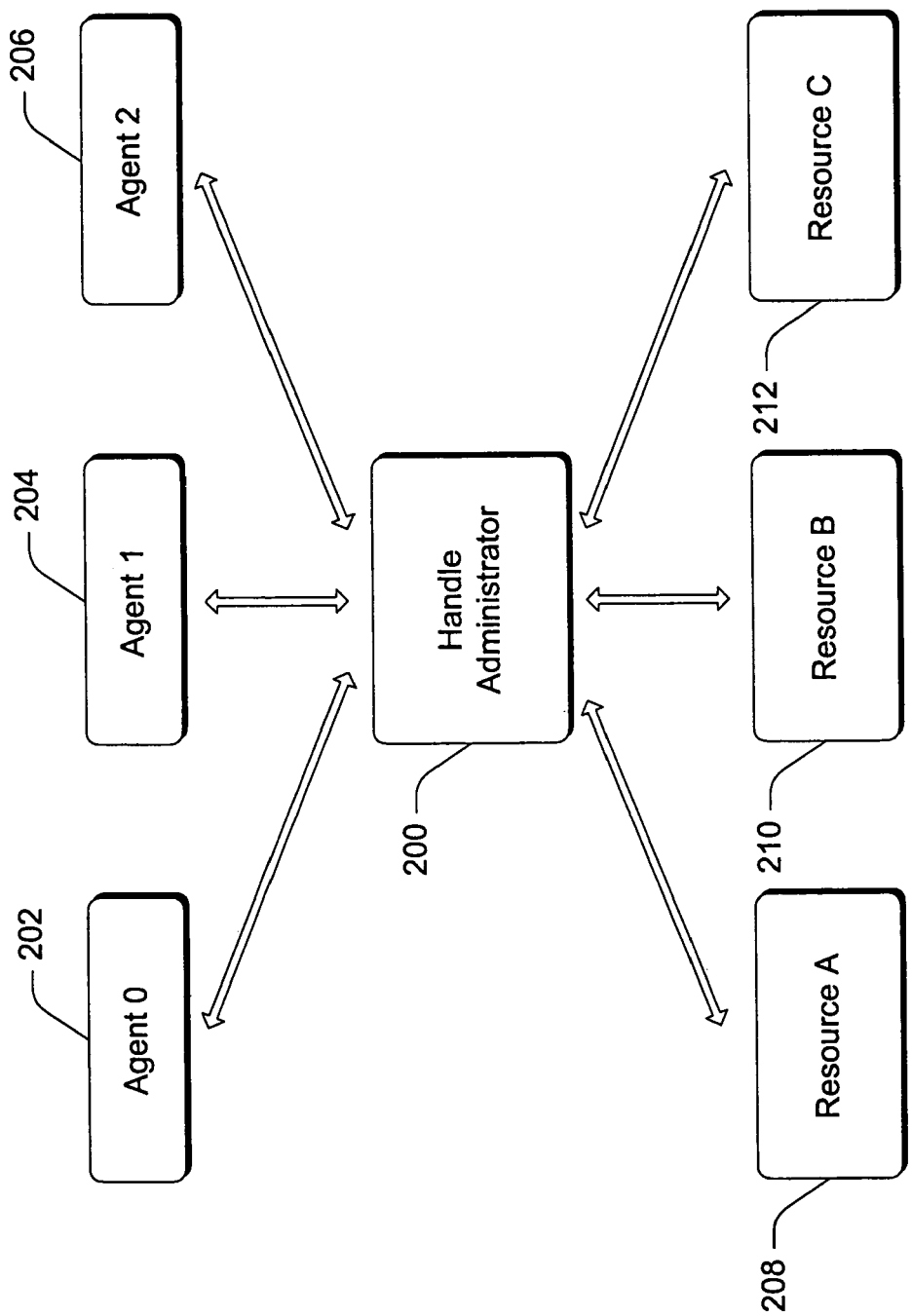
FIG. 2 is a high level block diagram of an exemplary handle administration system in accordance with the described embodiments.

FIG. 2 is a high level diagram that shows a handle administration system that includes a handle administrator 200. The handle administrator 200 can be part of a resource or access manager that is not specifically shown. The handle administrator can be implemented in any suitable hardware, software, firmware or combination thereof. A plurality of different agents 202, 204, and 206 are provided and are consumers of resources 208, 210, and 212. The agents are typically software modules, such as dynamic link libraries (DLLs), that require access to the resources. Resources 208, 210, and 212 can be any resources for which handles are typically used. Exemplary resources include files, data structures, or objects that are manipulated by the software modules. The agents 202-206 may require access (either sole or shared) to one or all of the resources.

Handle administrator 200 generates and validates handles to provide to the agents when the agents desire access to a resource. The handle administrator 200 uses the handles to efficiently manage access to the resources 208, 210, and 212. Typically, the handle administrator uses a handle database to manage various handles that can be used to access resources. To issue a handle, the handle administrator typically receives a call from a resource manager that includes a pointer to a resource. The handle administrator places the resource pointer in the handle database and associates a handle with the resource pointer. The handle administrator then returns the handle to the resource manager. Thereafter, the handle is used to access the resource pointer which, if valid, can be used to access the resource. When a particular resource is accessed by an agent, the agent presents the handle to the resource manager or handle administrator. The handle administrator ensures that the handle is still valid and if so, dereferences the handle to obtain the associated resource pointer for the agent to use in accessing the resource. If the handle is invalid, e.g. the associated resource has been removed, then the handle administrator can take the appropriate steps to ensure that the agent is notified. This might involve returning a null pointer to the agent.

Advantageously, the described handle administrator can suspend handles. When a handle is suspended, its state is changed from that of "assigned" to that of "suspended". A suspended handle can be considered as a tentatively released handle. A tentatively released handle is capable of being reinstated to an assigned state so that it can be validly dereferenced into a pointer to the same resource. When a handle is in the suspended state, it may still be associated with its resource but is incapable of being dereferenced into a pointer to that resource. The result is that any agent that requests access to a resource using a suspended handle is not given access to that resource. Once, however, a suspended handle is reinstated, agents can access the associated resource using the same handle as before.

Suspended State Handle System

Figure 3:
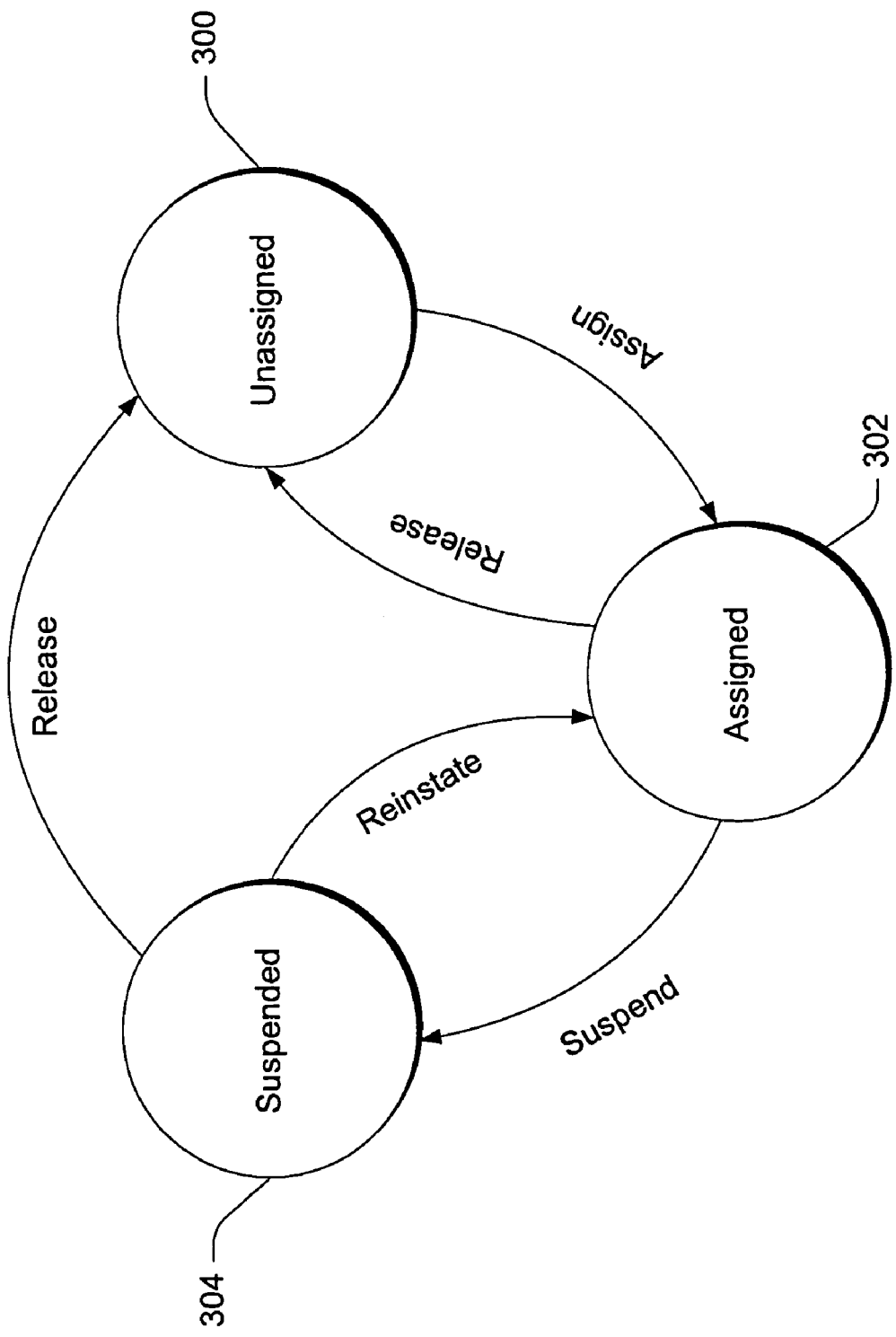
FIG. 3 is a state diagram that describes three exemplary states that handles can assume in a handle administration system in accordance with the described embodiment.

FIG. 3 is a state diagram that describes each of three states that a handle can have in accordance with the described embodiment. The handle states are managed by the handle administrator 200 (FIG. 2). Transitions between the states are accomplished by software routines that cause the handle administrator to manipulate a handle database that maintains a table of the handles. The illustrated states include an unassigned state 300, an assigned state 302, and a suspended state 304. The handle administrator is configured to assign, release, dereference, suspend, and reinstate handles that are associated with various resources.

When a handle is in the unassigned state 300, it can be placed into the assigned state 302 by an assign routine that assigns it to a particular resource and associates a pointer to that resource with the handle. The handle can then be provided to any agents that desire to access the associated resource. When a handle is in the assigned state 302, it can be placed into the unassigned state 300 by a release routine that marks the handle as invalid so that it can no longer be dereferenced to obtain a resource pointer. Advantageously, when a handle is in the assigned state 302 it can be placed into the suspended state 304 by a suspend routine. In the suspended state 304, a handle can be thought of as being tentatively released. That is, when a handle is suspended, it can still be bound to a particular resource, but it cannot be validly dereferenced into a pointer to that resource. Thus, any agents that present a handle to the handle administrator when the handle is in the suspended state will not receive a pointer to the associated resource. A handle can be returned to the assigned state 302 from the suspended state 304 by a reinstate routine. A handle that is in the suspended state 304 can be placed into the unassigned state 300 through a release routine.

Advantages of having a suspended state for handles include the support of a two-phase commit operation. A two-phase commit operation is useful in the following context. Assume that there are a number of agents that hold handles to various resources, such that different agents may hold different handles to the same resource. Assume also that a managerial component desires to eliminate a handle to a particular resource because that resource might not be further needed. An agent can be requested to release one of its handles, but if the agent is still using the indicated handle or resource, the agent will reject the request and not release the handle. Having the suspended state 304 enables a plurality of different agents to be requested to release their handles in a single atomic action. This means that either all of the agents will release their handles if the handles are not being used by any of the agents. Alternately, none of the agents will release their handles if any one of the agents is still using its handle. This result is achieved by a two-phase commit operation.

Two-Phase Commit Operation

Figure 4:
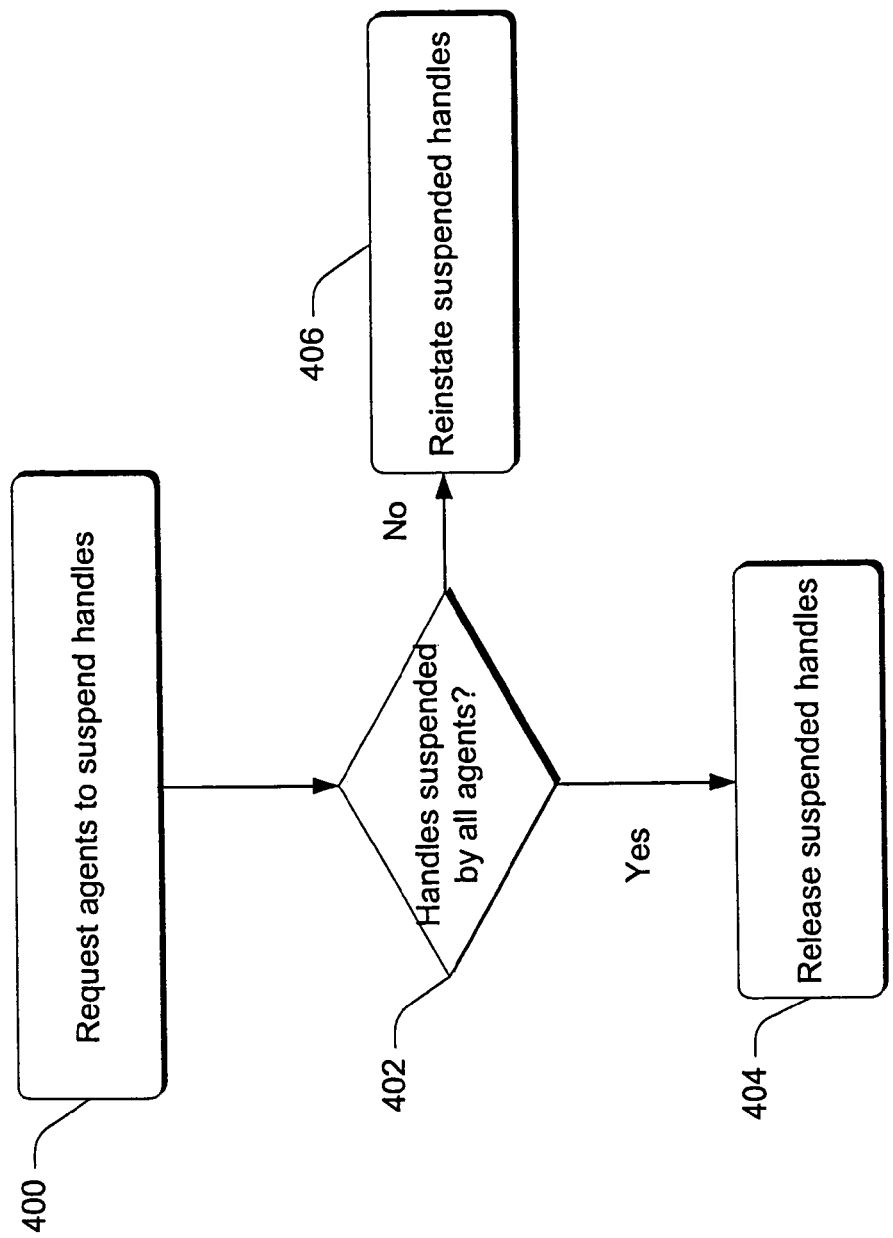
FIG. 4 is a flow diagram that describes steps in a method in accordance with the described embodiment.

FIG. 4 shows a flow diagram that describes steps in an exemplary two-phase commit operation. The goal of this operation is to have all agents release a set of handles in a single atomic action. Step 400 requests each agent to suspend a particular handle. This step can be implemented by a managerial component calling multiple different agents. Each agent responds to the request by examining its handles to see if the particular handle is in use. If the particular handle is in use, the agent refuses to suspend the particular handle and notifies the managerial component of its refusal. If the particular handle is not in use, the agent calls the handle administrator 200 or resource manager to suspend the particular handle, and the agent notifies the managerial component that it complied with the suspension request. Step 402 determines whether the particular handles have been suspended by each and every agent. If all of the agents have successfully suspended their handles, step 404 orders each agent to release its particular handle. The managerial component can be certain that all agents are able to comply with this order, because all agents have successfully suspended their particular handles, those particular handles are guaranteed not to be in use. Each agent responds to the order by calling the handle administrator 200 or resource manager to release its particular handle, at which time it becomes unassigned. When a handle is unassigned, it is available for assignment to other resources. If, on the other hand, any of the agents reports back that it cannot or will not suspend its particular handle, then step 406 reinstates all of the particular handles to the assigned state.

Exemplary Implementations

There are likely many ways to implement the above-described suspended state in various handle administration systems. The discussion below describes but two ways that this can be done. The two examples given below are given for exemplary purposes only and are not intended to limit the scope of the claimed subject matter. The first-described implementation makes use of a modified handle database structure, while the second-described implementation can make use of an existing handle database structure.

Use of Suspended Flag

FIG. 5 shows a table 500 that describes an exemplary data structure called a handle record. An array of these data structures is resident on a computer-readable medium and is used by the handle administrator to manage handles. Each of the handle records describes one particular handle in the handle record array.

Each handle record includes three fields 502 (handle), 504 (source) and 506 (suspended). Field 502 is a data item of type Handle that holds the value of the handle described by the record. Field 504 is a data item of type Resource* (pointer to Resource) that points to the resource associated with the handle. Field 506 is a data item of type bool (Boolean flag) that indicates whether the handle has been placed into a suspended state. This flag can then be checked, for example, by the dereference routine to ensure that the handle has not been suspended before dereferencing the handle into a pointer for a resource.

FIG. 6 shows an exemplary elementary handle database 600 that includes an array of four handle records. Each record is identified by a serial index 602, and each record contains the three fields described in table 500: handle 604, resource 606, and suspended 608. The serial index 602 indicates the index value or database location for a particular handle record. The handle field 604 holds a handle value for a particular handle record. The resource field 606 holds a pointer value for a particular resource that is associated with the handle value, and the suspended field 608 holds a value that indicates whether a particular associated handle has been suspended. In some systems, when the handle database is initialized, the handle values are set equal to the index of that record and the resource pointer is set to a null value. Additionally, the value in the suspended column can be set to an initial value. In the present example, there are four handle records in the handle database. The records are numbered 0-3. The handle values are set equal to the index values. In this particular example, the handle corresponding to the first index location is assigned to resource "A", the handle corresponding to the second index location is assigned to resource "B", the handle corresponding to the third index location is assigned to resource "C", and the handle corresponding to the fourth index location is assigned to resource "D". The handle in the fourth record has been suspended.

When an agent presents a handle, i.e. handle value, to the handle administrator 200 (FIG. 2) to access a resource, the handle administrator takes the handle and determines whether the handle is valid. In this example, the handle administrator first ascertains the location of the pertinent handle record in the handle database. In this case, assume that an agent presents a handle value of 0 to the handle administrator. The handle administrator then locates the pertinent handle record—here the handle record corresponding to an index of 0—and checks to determine whether the handle value that was presented by the agent is valid. The handle administrator also checks to ascertain whether the handle is suspended. To ascertain the validity of a handle or handle value, the handle administrator might simply compare the handle value presented by the agent with the handle value that is present in the handle field 604 for the handle of interest. If the values match, then the handle is valid. To ascertain whether the handle is suspended, the handle administrator can simply check the status of the suspended field 608 for the handle record of interest. If the handle is valid and not suspended, then the handle can be dereferenced into a pointer to the associated resource. Otherwise, the handle is not dereferenced into a pointer.

Figure 7:
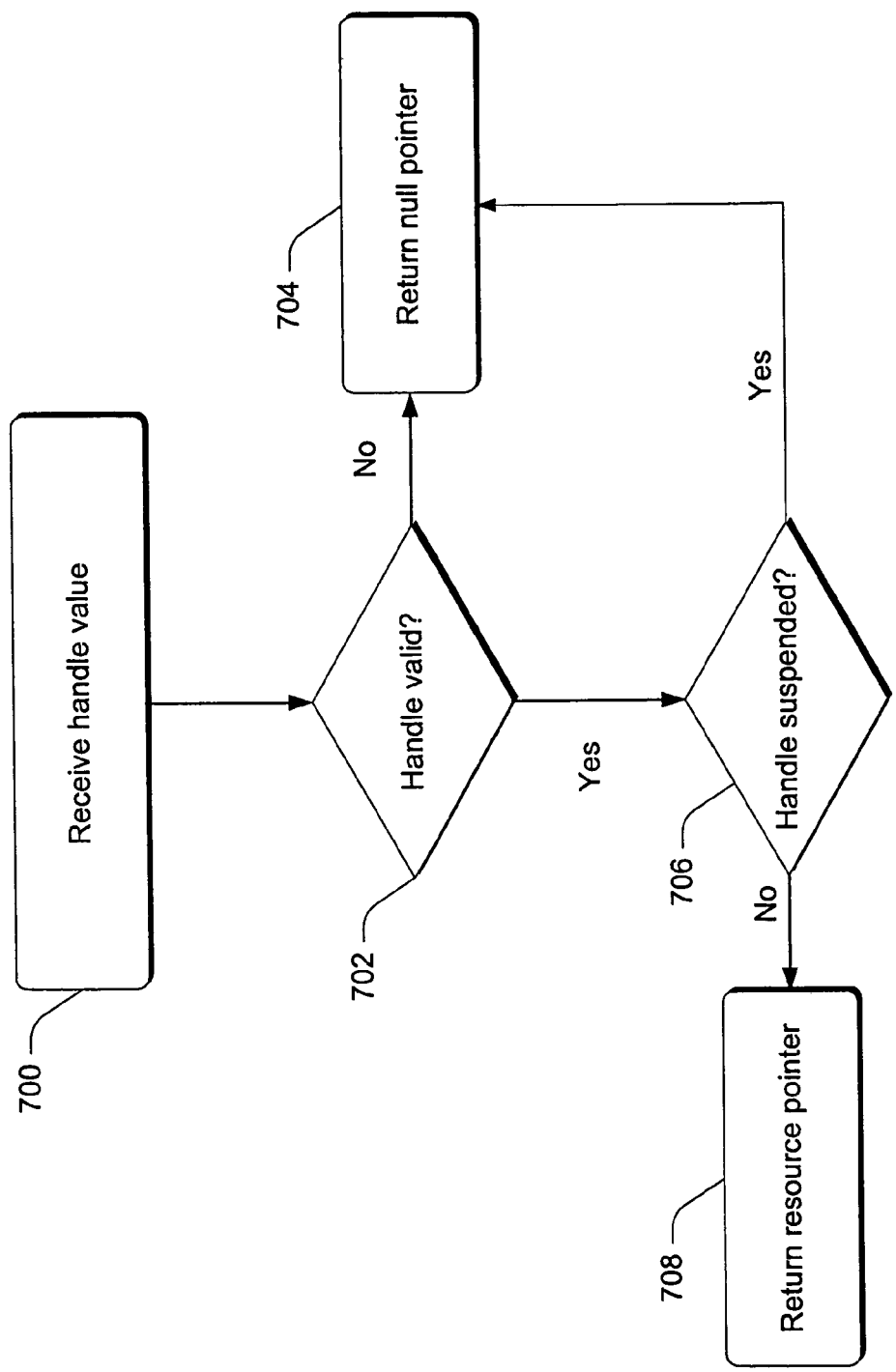
FIG. 7 is a flow diagram that describes steps in a method in accordance with the described embodiment.

FIG. 7 shows a flow diagram that describes steps in a dereferencing routine in accordance with this embodiment. Step 700 receives a handle value from one or more agents. Step 702 determines whether the handle value is valid. For example, if a handle has been placed into an unassigned state by being released, then it is not a valid handle that can be used to access a resource. One way of releasing a handle is to enter a value in the handle value field that is different from the present handle value. When the handle administrator compares handle values, the comparison is not favorable and thus the handle administrator will know that the handle presented by the agent is invalid. If the handle values do not match, thereby indicating an invalid handle, step 704 can return a null pointer to the agent. It will appreciated that any suitable action can be taken by the handle administrator when a handle is determined to be invalid. Returning a null pointer constitutes but one suitable action.

Assuming that the handle value is determined to be valid, step 706 determines whether the handle has been suspended. In this particular example, this step is implemented by simply checking the value of the suspended flag in the handle record that is associated with handle of interest. If the flag has a predetermined value that indicates a suspended handle, then step 706 can branch to step 704 and return a null pointer. In this example, a suspended handle is still associated with a particular resource—it is just treated as an unassigned handle for purposes of dereferencing. If, on the other hand, step 706 determines that the handle is not suspended, step 708 returns the appropriate resource pointer to the agent.

Although this approach can work well in many handle administration systems, there may be times when the additional processing overhead of checking the suspended flag, and the additional memory consumed by the suspended flag in each record can be avoided.

Use of Special Value for Handle Value

In one embodiment, a handle can be indicated as suspended by manipulating the handle value with a special value. For example, FIG. 8 shows an exemplary handle database or table that is similar to the handle database of FIG. 6, except that it does not contain a suspended flag field. Here, each of the handles that correspond to index entries 0-3 are assigned to respective resources A-D. Each of the handle values for index entries 0-2 have been initialized to the value of the index. Notice that the handle value for index value 3 is $(3+2^{10})$. This handle value was formerly equal to 3 (i.e. the index value) before the handle was suspended. This special value now indicates that the handle that corresponds to index value 3 is suspended. In this particular example, a handle is suspended by adding $2^{10}$ to the original handle value. When a handle is suspended, in this example, it is still associated with a particular resource. It cannot, however, be dereferenced into a resource pointer for that resource.

Consider, for example, what happens when an agent presents a handle value of 3 to the handle administrator. The handle administrator locates the appropriate index value that corresponds to the handle value and then determines whether the handle value provided by the agent matches the handle value in the database. Here, since 3 does not match $(3+2^{10})$, the handle administrator treats the handle as if it is unassigned. This means that the agent that presented the handle value does not get access to the resource that is associated with that handle value. To reinstate a handle, the special value that was added to the handle value is simply subtracted from the value that occupies the handle value field for the handle of interest. In the described embodiment, the particular handle value manipulations that enable a handle to be suspended and reinstated are addition and subtraction respectively. It is to be understood that other handle value manipulations could take place without departing from the spirit and scope of the claimed subject matter.

In particular implementations, characteristics of the special value that is used to indicate that a handle is suspended include that the value should be a value that is larger than the table size of the index table or handle database (in this example the table size is 4). This value should also take into account the fact that some handle databases can grow and shrink in size over the course of time. An exemplary handle database that does just that is described in U.S. application Ser. No. 09/103,334, entitled "Generation and Validation of Reference Handles, filed on Jun. 23, 1998, which is assigned to the assignee of this application, the disclosure of which is incorporated by reference herein. In addition, the special value should be a fixed value so that the handle can be reinstated through a simple procedure such as a subtraction operation described above. In this particular example, a handle can be reinstated by simply subtracting $2^{10}$ from the value now held in the handle value field to yield the original handle value of 3. In addition, in some handle administration systems it is particular advantageous to use a power of 2 as the special value for internal purposes.

FIG. 9 shows a flow diagram that describes steps in a handle suspension method in accordance with the described embodiment. Step 900 determines that a particular handle is to be suspended. This might be done when a resource with which the handle is associated is desired to be eliminated as mentioned above. Step 902 suspends the handle by adding a value to the handle value that is contained in the handle database for the handle of interest.

FIG. 10 shows a flow diagram that describes steps in a handle reinstatement method in accordance with the described embodiment. Step 1000 determines that a particular handle is to be reinstated. One reason for reinstating a handle might be the failure of the first phase of a two-phase commit operation. Step 1002 reinstates the handle by subtracting the value (i.e. $2^{10}$) that was originally added to the handle value to suspend it. This returns the handle value to its original value and places it in an assigned state.

The above described process greatly facilitates the manner in which handles can be suspended and reinstated. This approach is particularly useful in the context of a specific handle administration system that is described in U.S. patent application Ser. No. 09/103,334. For the sake of brevity, the specific operation of that system is not described herein. In the context of the handle administration system disclosed in the referenced application, the special value that is utilized to suspend handle is known as the handle range step. The handle range step is a special large value that is a power of 2. This value is typically used in the described system to automatically revoke handles in a system-wide manner. The described system periodically revokes all handles whose values are greater than or equal to a value known as the handle base and less than the handle base plus the handle range step. By using the handle range step as the special value added to a handle value to indicate suspension, several important properties of the described system are preserved: 1) The assign, release, expand, and contract procedures will treat the record as though it is assigned, so the record will be preserved for possible future reinstatement. 2) The dereference procedure will treat the record as though it is invalid, so it will refuse to dereference the handle to a pointer to the associated resource. 3) The expand and contract routines will properly locate the handle record when the database is expanded and contracted. 4) The handle revocation routine will revoke suspended handles at approximately the same time as it would revoke the handle if it were not suspended. The use of a handle range step will be understood by those familiar with the described handle administration system and is not discussed in detail here. In connection with using the handle range step to suspend handles in the referenced disclosure, a few modifications of that system should be implemented. First, in the referenced handle administration system, the handle base is initialized to 0. In the present case, the handle base should be initialized to the record array size minus the handle range step. Additionally, in the referenced handle administration system there is a process for revoking so-called ancient handles. There, a revocation range is described as a range from the handle base to the handle base plus the handle range step. In the present context, the revocation range is redefined as the range from the handle base to the handle base plus two times the handle range step.

Additionally, in the referenced handle administration system, the release routine checks to determine whether the handle value that is passed in by the agent matches the handle value in the handle record. If it does not, then the release operation is aborted since the handle passed to the release routine is not currently assigned. In the present context, the release routine checks whether the handle value that is passed to the release routine matches the handle value in the handle record (indicating an assigned handle) or whether it matches the handle value in the handle record minus the handle range step (indicating a suspended handle). If either of the values match the value passed to the release routine, then the handle can be released.

CONCLUSION

The described embodiments advantageously provide for a three-state handle administration system. The suspended state enables handles to be tentatively released from the assigned state. Suspended handles can be reinstated to their previously assigned state or permanently released into the unassigned state. Having this flexibility greatly facilitates the use of handle administration systems. For example, using the above described suspended state, two-phase commit operations can now be implemented whereas before, with other handle administration systems, they could not. Other advantages will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of managing resources comprising:
   receiving a handle value;
   determining whether the handle value is suspended, wherein a handle associated with the handle value is associated with a resource, and wherein when a handle is suspended, it cannot be dereferenced into a pointer to its associated resource; and
   if the handle value is not suspended, returning a reference pointer that points to a resource with which the handle is associated.

2. The method of claim 1 further comprising determining whether the handle is valid and returning a reference pointer only if the handle is valid and not suspended.

3. The method of claim 2 further comprising returning a null pointer if the handle is invalid or suspended.

4. The method of claim 1 further comprising returning a null pointer if the handle is suspended.

5. The method of claim 1 wherein the handle has more than two states into which it can be placed, the states comprising:
   an assigned state in which the handle is associated with a resource and can be dereferenced to obtain a pointer to that resource;
   an unassigned state in which the handle is available for assignment to a particular resource; and
   a suspended state.

6. The method of claim 5 further comprising reinstating a handle from the suspended state to the assigned state.

7. The method of claim 5 further comprising releasing a handle from the suspended state to the unassigned state.

8. One or more computer-readable media having computer readable instructions thereon which, when executed by one or more computers, cause the computers to:
   receive a handle value;
   determine whether the handle value is suspended, wherein a handle associated with the handle value is associated with a resource, and wherein when a handle is suspended, it cannot be dereferenced into a pointer to its associated resource; and
   return a reference pointer that points to a resource with which the handle is associated, if the handle is not suspended.

9. The computer-readable media of claim 8, wherein the instructions cause the computers to suspend an assigned handle.

10. A method of managing resources comprising:
    defining a handle database that contains information pertaining to a plurality of handles, the information comprising a handle value; and
    suspending a handle by adding a value to the handle value, wherein when a handle is suspended, it cannot be dereferenced into a pointer to an associated resource.

11. The method of claim 10 further comprising reinstating the suspended handle by subtracting the value from the handle value.

12. The method of claim 10 further comprising releasing the handle.

13. The method of claim 10, wherein said value comprise a handle range step value.

14. The method of claim 10, wherein said value comprises a power of 2.

15. The method of claim 10, wherein the handle database comprises a table having a table size that corresponds to the number of handles that are available for assignment, and wherein the suspending comprises adding a value to the handle value that is larger than the table size.

16. One or more computer-readable media having computer-executable instructions thereon which, when executed by a computer, implement the method of claim 10.

17. A system comprising:
    one or more processors;
    one or more computer-readable media;
    computer-readable instructions on the one or more computer-readable media which, when executed by the one or more processors, cause the one or more processors to implement a method comprising:
    receiving a handle value;
    determining whether the handle value is suspended, wherein a handle associated with the handle value is associated with a resource, and wherein when a handle is suspended, it cannot be dereferenced into a pointer to its associated resource; and
    if the handle value is not suspended, returning a reference pointer that points to a resource with which the handle is associated.

18. The system of claim 17 further comprising determining whether the handle is valid and returning a reference pointer only if the handle is valid and not suspended.

19. The system of claim 18 further comprising returning a null pointer if the handle is invalid or suspended.

20. The system of claim 17 further comprising returning a null pointer if the handle is suspended.

21. The system of claim 17 wherein the handle has more than two states into which it can be placed, the states comprising:
    an assigned state in which the handle is associated with a resource and can be dereferenced to obtain a pointer to that resource;
    an unassigned state in which the handle is available for assignment to a particular resource; and
    a suspended state.

22. The system of claim 21 further comprising reinstating a handle from the suspended state to the assigned state.

23. The system of claim 21 further comprising releasing a handle from the suspended state to the unassigned state.

24. A system comprising:
means for receiving a handle value;
means for determining whether the handle value is suspended, wherein a handle associated with the handle value is associated with a resource, and wherein when a handle is suspended, it cannot be dereferenced into a pointer to its associated resource; and
means for, if the handle value is not suspended, returning a reference pointer that points to a resource with which the handle is associated.

25. The system of claim 24 further comprising means for determining whether the handle is valid and means for returning a reference pointer only if the handle is valid and not suspended.

26. The system of claim 25 further comprising means for returning a null pointer if the handle is invalid or suspended.

27. The system of claim 24 further comprising means for returning a null pointer if the handle is suspended.

28. The system of claim 24 wherein the handle has more than two states into which it can be placed, the states comprising:
an assigned state in which the handle is associated with a resource and can be dereferenced to obtain a pointer to that resource;
an unassigned state in which the handle is available for assignment to a particular resource; and
a suspended state.

29. The system of claim 28 further comprising means for reinstating a handle from the suspended state to the assigned state.

30. The system of claim 28 further comprising means for releasing a handle from the suspended state to the unassigned state.

31. A system comprising:
one or more processors;
one or more computer-readable media;
computer-readable instructions on the one or more computer-readable media which, when executed by the one or more processors, cause the one or more processors to implement a method comprising:
defining a handle database that contains information pertaining to a plurality of handles, the information comprising a handle value; and
suspending a handle by adding a value to the handle value, wherein a handle is associated with a resource, and wherein when a handle is suspended, it cannot be dereferenced into a pointer to its associated resource.

32. The system of claim 31 further comprising reinstating the suspended handle by subtracting the value from the handle value.

33. The system of claim 31 further comprising releasing the handle.

34. The system of claim 31, wherein said value comprise a handle range step value.

35. The system of claim 31, wherein said value comprises a power of 2.

36. The system of claim 31, wherein the handle database comprises a table having a table size that corresponds to the number of handles that are available for assignment, and wherein the suspending comprises adding a value to the handle value that is larger than the table size.

* * * * *

UNITED STATES PATENT AND TRADEMARK OFFICE
CERTIFICATE OF CORRECTION

| | | |
|---|---|---|
| PATENT NO. | : 7,373,404 B2 | Page 1 of 1 |
| APPLICATION NO. | : 10/966916 | |
| DATED | : May 13, 2008 | |
| INVENTOR(S) | : John R. Douceur et al. | |

It is certified that error appears in the above-identified patent and that said Letters Patent is hereby corrected as shown below:

In column 7, line 25, after "handles," insert -- so --.

Signed and Sealed this
Fifteenth Day of February, 2011

David J. Kappos
*Director of the United States Patent and Trademark Office*